Oct. 27, 1970        T. DZUS        3,535,752
FASTENER ASSEMBLY
Filed April 23, 1968        2 Sheets-Sheet 1
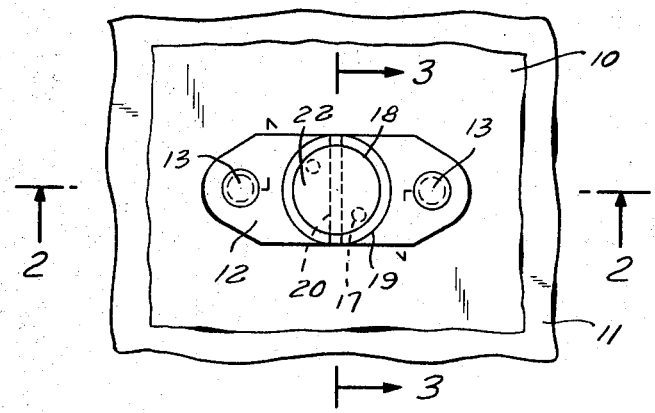
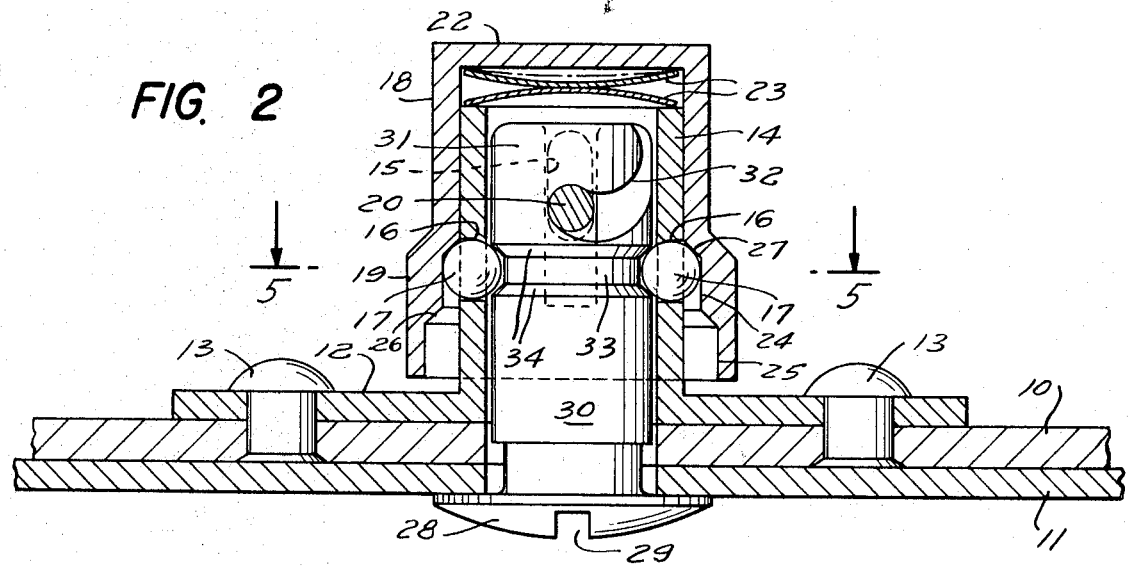
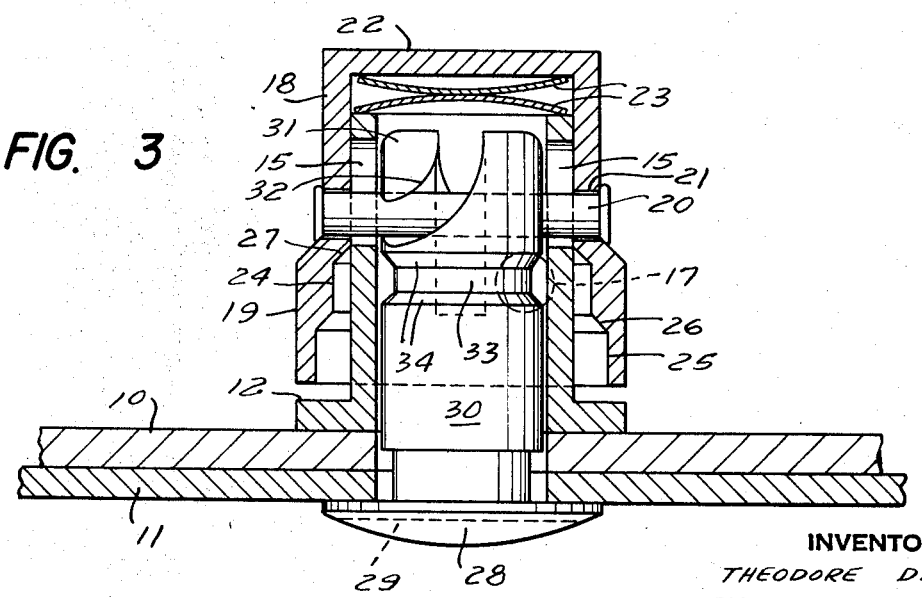
INVENTOR
THEODORE DZUS
BY
Daniel H. Kane
ATTORNEY Oct. 27, 1970    T. DZUS    3,535,752
FASTENER ASSEMBLY
Filed April 23, 1968    2 Sheets-Sheet 2
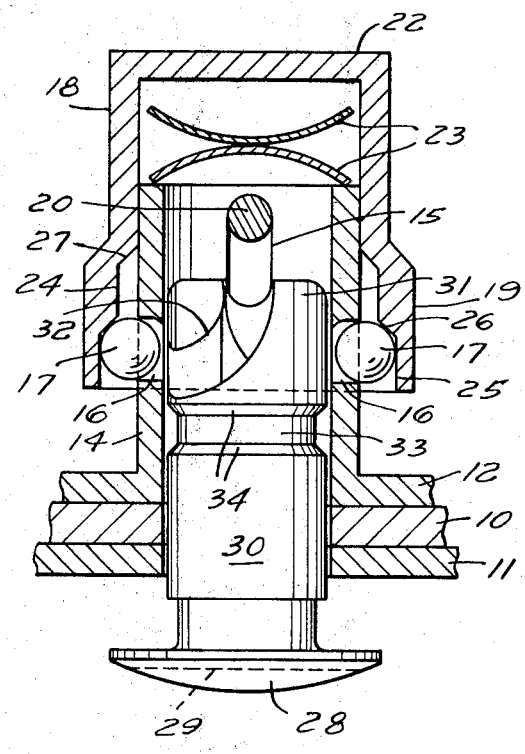
FIG. 4
FIG. 5
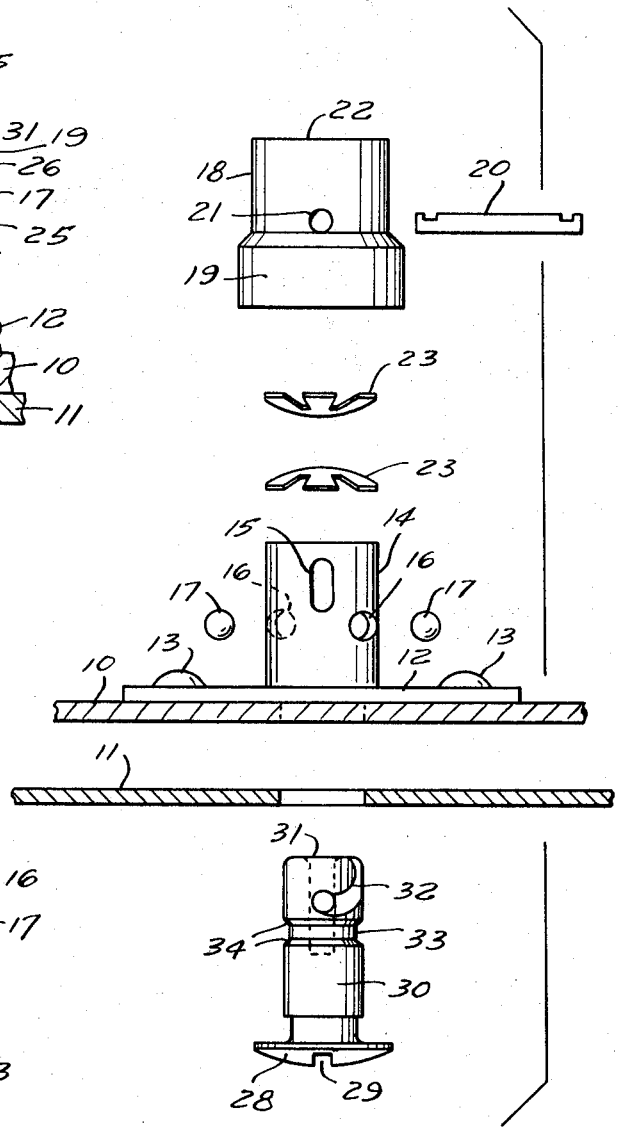
FIG. 6
INVENTOR
THEODORE DZUS
BY
Daniel H. Kane
ATTORNEY 3,535,752
FASTENER ASSEMBLY
Theodore Dzus, West Islip, N.Y., assignor to Dzus
Fastener Co. Inc., West Islip, N.Y., a corporation of
New York
Filed Apr. 23, 1968, Ser. No. 723,443
Int. Cl. A44b 17/00
U.S. Cl. 24—221      2 Claims

ABSTRACT OF THE DISCLOSURE

A fastener assembly in which a stud and receptacle are engageable in the usual manner with cam slots in the stud engaging a cross rod in the receptacle and in addition the receptacle is provided with detents and is of telescoping construction so that upon interengagement of the stud and receptacle the receptacle is telescoped to cause the detents to engage a recess in the stud.

BACKGROUND OF THE INVENTION

Fastener assemblies as disclosed in the above patent include a stud embracing a head and shank. The stud is conveniently rotated by a suitable tool such as a screw driver. To this end its head is conveniently formed with a tool receiving groove. The shank is formed with spiral cam slots. These engage a crosspin or rod associated with the receptacle to retain it. Thus the strength of the assembly is dependent upon the rod and the stud material defining the surfaces of the slots. Under extreme load conditions this has resulted in shearing of the parts.

SUMMARY OF THE INVENTION

By conforming to the following teachings a fastener assembly is furnished in which the stud, in addition to being connected to the receptacle by engagement of the cam slot surfaces with the rod, will be coupled therewith by a secondary structure. This will involve detents also carried by the receptacle and engageable with surfaces of the stud shank. Therefore, the shear and tensile strength of the assembly is increased, as is also its stability.

Thus it is a primary object of the invention to provide a simple fastener assembly involving novel stud and receptacle structures cooperating to furnish a stable unit having high shear and tensile strength characteristics.

A further object is that of furnishing an assembly, the parts of which lend themselves to quantity and relatively economical production.

BRIEF DESCRIPTION OF THE DRAWING

With these and other objects in mind, reference is had to the accompanying drawings in which:

FIG. 1 is a plan view of the receptacle in mounted condition;

FIG. 2 and 3 are sectional side views of the assembly taken respectively along lines 2—2 and 3—3 and in the direction of the arrows as shown in FIG. 1;

FIG. 4 is a view similar to FIG. 2 but showing the several parts in unlocked position in their initial application to each other;

FIG. 5 is a sectional plan view taken along the line 5—5 in the direction of the arrows as indicated in FIG. 2; and, FIG. 6 is an exploded side elevation of the several parts of the assembly.

BRIEF DESCRIPTION OF THE PREFERRED EMBODIMENT

In these views the numerals 10 and 11 indicate parts of plates to be secured to each other by the fastener. Each of them are formed with an aperture of a diameter greater than that of the stud shank of the assembly. The receptacle thereof is conveniently secured to plate 10 by means of rivets 13 which pass through openings in the flange portion 12 of a receptacle element to maintain the bore of the latter aligned with the opening of that plate.

As shown especialy in FIG. 6 the receptacle element is in the form of a collar 14 extending perpendicular to plate 10 and conveniently integral with portion 12. The collar bore is of a diameter such that it will slidably accommodate the stud shank. At diametrically opposed points it is formed with axially extending slots 15. Also, it is formed with a desired number of detent receiving openings 16. As illustrated, they may be two in number and at opposed points in the collar. Their areas are such that they accommodate detents 17 preferably of spherical form. The inner ends of openings 16 are constricted to an extent sufficient to prevent the detents from passing inwardly therethrough.

Also forming a part of the receptacle is a cap 18, the inner end of which terminates in a skirt portion 19. A cross-pin or rod 20 extends across the cap bore and has its ends supported by lying within openings 21 formed as points adjacent portion 19. An end wall 22 closes the outer end of the cap; the latter having a bore which will receive collar 14. A spring is interposed between end wall 22 and the outer edge of collar 14 to thus urge the cap to assume an extended position (FIG. 4). A preferred form of spring involves a pair of bulged and slotted plates 23 formed of resilient metal and disposed in opposed relationship between the end wall 22 and the outer edge of collar 14.

The inner face of skirt portion 19 defines detent retaining and shifting surfaces. As in FIG. 3 they conveniently involve face 24 adjacent the outer zone of the collar and a larger diameter surface 25 adjacent its inner end. Both of these extend parallel to the cap axis and are connected by an inwardly inclined camming surface 26. An end surface 27 is located adjacent the outer end of the skirt zone. Beyond this point the cap slideably embraces collar 14.

The ends of the cross-pin or rod 20 may extend beyond the outer face of the cap, as in FIG. 3. In all events it is preferred to secure it against movement with respect to the cap, by welding or otherwise. The rod extends through the slots 15 of the collar 14. With the parts thus assembled the detents 17 will lie within the openings 16 of the collar. Accordingly, they will be limited solely to movements perpendicular to the collar axis.

The stud of the assembly embraces a head 28 formed with a groove 29, or any other desired indentation presenting tool-engageable surfaces so that it may be rotated. Its stem includes two relatively enlarged portions 30 and 31 separated by a groove 33 having inclined side walls 34. The enlarged portion 31 is bored and formed with cam slots 32. Its diameter allows for passage through the openings in plates 10 and 11. The outer edge of portion 31 is rounded for cooperation with the spherical detents 17.

Therefore, it will be seen that if a pair of members, such as plates 10 and 11, are to be secured against movement with respect to each other the base or flange portion 12 of the collar will be attached to plate 10 in any desired manner. The spherical detents 17 will be prevented from moving inwardly beyond a certain point due to the fact that the inner ends of openings 16 are constricted to define a diameter of less than that of the detents. Outward movement of the latter will be prevented by surface 25 of the cap portion 19, as in FIG. 4. The receptacle parts will be maintained in this position by means of spring assembly 23 and the limitation of movement imposed by rod 20 engaging the end of slot 15.

Plate 11 will now be positioned so that its aperture aligns with the bore of the receptacle parts. The stem of the stud is introduced through the opening of plate 11 into the recptacle bore, as in FIG. 4. The rounded outer end edge of the stem will cause a retraction of the detents, if they extend into the collar bore. Further projection of the stem will cause it to engage with rod 20 and rotation plus pressure will cause the rod to enter slot 32 and ride against the cam edge of its slots.

Accordingly, under continued rotation and pressure the rod 20 will ride over the edges of the slots and beyond extreme cam surfaces defined by their inner ends. Under these conditions only a reverse and deliberate rotation of the stud will cause the receptacle to disconnect from the stud. Simultaneously with the coupling of these units they will telescope with respect to each other from the position of FIG. 4 to that of FIGS. 2 and 3. This is due to the fact that the ends of rod 20 ride within the slots 15 and are coupled to the cap. It follows that the detents 17 will have the outermost cam surface 26 ride over them, to project them inwardly into groove 33.

Thus, forces on the parts is distributed on both the rod 20 as well as the outermost surface 34 of the stem. Accordingly, the assembly will amply resist stresses materially beyond those which would result if dependence were placed solely on the rod, or cross-pin. As will be apparent a reverse rotation of the stud will cause the rod to override the cam surfaces of the slots. Upon this occurring the spring 23 will thrust against the cap and collar to project the latter. Simultaneously the rod will move outwardly within slots 15 of the collar and thus positively shift the cap to the position shown in FIG. 4. As this shifting occurs the inner cam surface 34 of the stud will move in contact with the detents to thrust them outwardly. Thereupon the stud may be withdrawn from the collar.

It is apparent that the fastener assembly will have very high shear and tensil strength characteristics and that modification of the structure may be resorted to without departing from the spirit of the invention as defined by the claims.

Having now described the invention, I claim:

1. A fastener assembly including in combination: a pair of receptacle parts including a collar having diametrically opposite, longitudinally extending slots, a cap telescopically slideable over the collar, mounting means for the collar, and a transversely extending rod carried by said cap and extending through the slots formed in said collar; a stud comprising a head and a stem, said stem being formed with cam slots which receive said rod as such stem is projected into and rotated with respect to the receptacle parts to limit axial stud movement with respect thereto and also being formed with a recess in the outer face; and a shiftable detent carried by the collar, said cap being formed with a cam surface on its inner face so that when the stud is rotated in one direction with the cam slots in engagement with the rod the cap is shifted telescopically with respect to the collar and the cam surface on the inner face of the cap projects the detent into engagement with the recess in the stem of the stud.

2. In a fastener assembly as defined in claim 1, the detent comprising a pair of spherical elements and the stem recess being in the form of an annular groove therein.

References Cited

UNITED STATES PATENTS

| | | |
|---|---|---|
| 2,527,408 | 10/1950 | Dzus. |
| 2,887,753 | 5/1959 | Ralph. |

FOREIGN PATENTS

| | | |
|---|---|---|
| 786,644 | 11/1957 | Great Britain. |

BERNARD A. GELAK, Primary Examiner